US012642729B2

(12) United States Patent
Fecke-Schulte

(10) Patent No.: US 12,642,729 B2
(45) Date of Patent: Jun. 2, 2026

(54) HYPOMOCHLION OF AN OPERATING TABLE

(71) Applicant: CONDOR Medtec GmbH, Salzkotten (DE)

(72) Inventor: Ira Fecke-Schulte, Delbrück (DE)

(73) Assignee: CONDOR Medtec GmbH, Salzkotten (DE)

( * ) Notice: Subject to any disclaimer, the term of this patent is extended or adjusted under 35 U.S.C. 154(b) by 50 days.

(21) Appl. No.: 18/918,167

(22) Filed: Oct. 17, 2024

(65) Prior Publication Data

US 2025/0127673 A1 Apr. 24, 2025

(30) Foreign Application Priority Data

Oct. 20, 2023 (DE) ..................... 10 2023 128 895.4

(51) Int. Cl.
*A61G 13/00* (2006.01)

(52) U.S. Cl.
CPC ................................ *A61G 13/0081* (2016.11)

(58) Field of Classification Search
CPC ................ A61G 13/00; A61G 13/0036; A61G 13/0081; A61G 13/101
See application file for complete search history.

(56) References Cited

U.S. PATENT DOCUMENTS 3,020,909 A * 2/1962 Stevens .............. A61G 13/0036 5/624
4,624,245 A * 11/1986 Mullin ................... A61G 13/12 5/621
7,745,996 B2 * 6/2010 Lim ......................... H01J 11/12 313/582

FOREIGN PATENT DOCUMENTS

DE 102022105130 A1 9/2023

* cited by examiner

*Primary Examiner* — Fredrick C Conley
(74) *Attorney, Agent, or Firm* — Laurence A. Greenberg; Werner H. Stemer; Ralph E. Locher

(57) ABSTRACT

An operating table hypomochlion includes a control device for a support arm mounted therein and longitudinally adjustable in a transverse recess of a pivotable control disk, an end femoral support, and a reverse pivot lock releasable in pivoting direction. A biased control wedge engages a wedge gap between a functional surface of the control device and a convex front-side control surface of the control disk. The support arm and femoral support have limitable angular deflection since the control device has an adjusting device with a control slide in front of a narrow side of the control wedge. The control wedge in zero position is out of engagement with the control surface, and in operating position, with the control slide moved out of contact, engages the control surface permitting angle adjustment of the support arm in rotation direction from bottom upward and locking in opposite direction of rotation from top downward.

7 Claims, 4 Drawing Sheets

HYPOMOCHLION OF AN OPERATING TABLE

CROSS-REFERENCE TO RELATED APPLICATION

This application claims the priority, under 35 U.S.C. § 119, of German Patent Application DE 10 2023 128 895.4, filed Oct. 20, 2023; the prior application is herewith incorporated by reference in its entirety.

FIELD AND BACKGROUND OF THE INVENTION

The invention relates to a hypomochlion of an operating table, including a control device for a support arm which is mounted in the latter in a longitudinally adjustable manner in a transverse recess of a control disk pivotable through an angle, with an end-side femoral support, and with a reverse pivot lock releasable in a pivoting direction and including a spring-loaded control wedge which engages in a wedge gap between a functional surface of the control device and a convex front-side control surface of the control disk.

A hypomochlion of an operating table is known (from German Patent Application DE 10 2022 105 130 A1) which, like the present hypomochlion, serves to create sufficient free space for a minimally invasive intervention in a patient's joint. In order to support optimal positioning, hypomochlions of that kind are known which generate additional pressure or leverage forces on the limbs of a patient where necessary, for example in order to optimize the mutual position of joint surfaces. Although the known hypomochlion already provides a control system which is easy to handle and which also makes it easier to carry out positional adjustments required during an operation under load, its operation is still too complex, and the production of the known hypomochlion is very laborious and complicated. It also lacks an adjustable movement limitation of the pivoting angle of the support arm counter to the direction of support.

SUMMARY OF THE INVENTION

It is accordingly an object of the invention to provide a hypomochlion of an operating table, which overcomes the hereinafore-mentioned disadvantages of the heretofore-known devices of this general type, which has a much less complicated configuration, which is easy and uncomplicated to handle and which has a limitable angular deflection of the support arm and therefore of the femoral support.

With the foregoing and other objects in view there is provided, in accordance with the invention, a hypomochlion of an operating table, including a control device for a support arm which is mounted in the latter in a longitudinally adjustable manner in a transverse recess of a control disk pivotable through an angle, an end-side femoral support, and a reverse pivot lock releasable in a pivoting direction and formed of a spring-loaded control wedge which engages in a wedge gap between a functional surface of the control device and a convex front-side control surface of the control disk, the control device is equipped with an adjusting device which has a control slide extending in front of a narrow side of the control wedge, and the control wedge in a zero position is held out of engagement with the control surface and in an operating position, with the control slide moved out of contact, is in engagement with the control surface and then permits an angle adjustment of a support arm of a femoral support in a direction of pivoting from the bottom upward and locks it in the opposite direction from the top downward.

This inventive hypomochlion also makes it possible, for example when a femoral support configured as a cushioned roll gives way, to track or further pivot the support arm without using tools, which support arm then immediately locks itself automatically again in the new position, in such a way that such a correction can be carried out quickly and easily without the need for loaded fastening screws to be undone and retightened, so that optimum operating conditions can be maintained throughout and, in order to bring the hypomochlion into service, the control slide simply has to be pivoted from a zero position to an operating position, thereby greatly simplifying the handling of the inventive hypomochlion.

Further advantageous embodiments of the subject matter of the invention are obtained with and in combination from the following subclaims.

Of very particular advantage is an embodiment of a hypomochlion in which the control wedge is formed with a shallow wedge angle of between 2° and 8° and its wedge surface and also the control surface of the control disk have mutual latching devices, these being very finely executed, thus permitting an almost infinitely variable adjustment of the hypomochlion. The control wedge is in this case pretensioned, via an elastic element, in the direction of the gap between the control surface of the control disk and a flat support surface of the control device for the control wedge, wherein the elastic element can be formed of a metallic helical spring, which is configured as a compression spring. In an operating position, the support arm of the hypomochlion can then be pivoted in a pivoting direction counter to the pretensioning force of the compression spring, skipping over the fine toothing correspondingly, wherein, in the event of a pivoting movement of the control disk in the pressure direction of the elastic element, the clamping effect of the control disk on the control wedge and the functional surface of the control device is strengthened, with the result that a reverse pivoting movement of the support arm of the femoral support is locked in a force-locking and especially form-locking manner. This reliably prevents the control disk from accidentally slipping.

According to a particularly preferred embodiment of the invention, the control disk, on its side opposite the downwardly directed and toothed concave control surface, is equipped with an upper stop surface on which a height stop of the control device adjustably engages in a direction transverse to the pivot axis of the control disk and thus adjustably limits the possible angular deflection of the support arm counter to the direction of support.

Basically, the hypomochlion has a control chuck which has, below the pivot axis of the control disk, a protruding bolt which extends through an arc-shaped recess about the pivot axis in the control disk and thus limits the maximum pivoting movement of the latter. However, the height stop permits an adjustable limitation of the angular deflection of the control disk, which is disposed pivotably between a control chuck and a control cover, and between which a guide plate with an oblong hole oriented transversely with respect to the pivot axis is clamped above the upper stop surface of the control disk, through which oblong hole a clamping screw extends from above into the height stop disposed under the guide plate, the height stop being disposed in the oblong hole so as to be transversely movable under the guide plate.

The underside of the guide plate, facing toward the height stop, and also the side of the height stop facing the guide plate furthermore have mutually facing latching surfaces, which are likewise provided with fine teeth, so that the clamping screw, which is disposed in a neutral zero position above the pivot axis of the control disk, can be moved laterally over the stop surface of the control disk and can be locked in place, as a result of which the possible adjustment angle is reduced as required. The stop surface can be configured to deviate from a flat surface by rising or falling, so that a progressive or degressive adjustment of the pivot limit of the control disk is set.

According to an advantageous embodiment of the invention, the adjusting device is equipped with an actuating lever for the control slide, which is configured to be releasably lockable in a zero position and in at least one operating position, wherein, in one embodiment for allowing the hypomochlion to be disposed on both sides of an operating table, it is configured to be releasably lockable in two operating positions about the zero position. For this purpose, the control device has two control wedges which are disposed in opposite directions with their points directed toward each other and both of which, in a zero position, bear on the control slide, in such a way that the control disk is able to pivot freely over the pivot axis of the control disk when a star knob is released and with the height stop in a central position.

The inventive hypomochlion can therefore be controlled particularly easily via a single actuating lever, while the mechanical configuration is kept very simple and robust, and the additional limitation of the possible angle adjustment of a support arm safely prevents accidental overloading of a patient's femur.

Other features which are considered as characteristic for the invention are set forth in the appended claims.

Although the invention is illustrated and described herein as embodied in a hypomochlion of an operating table, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
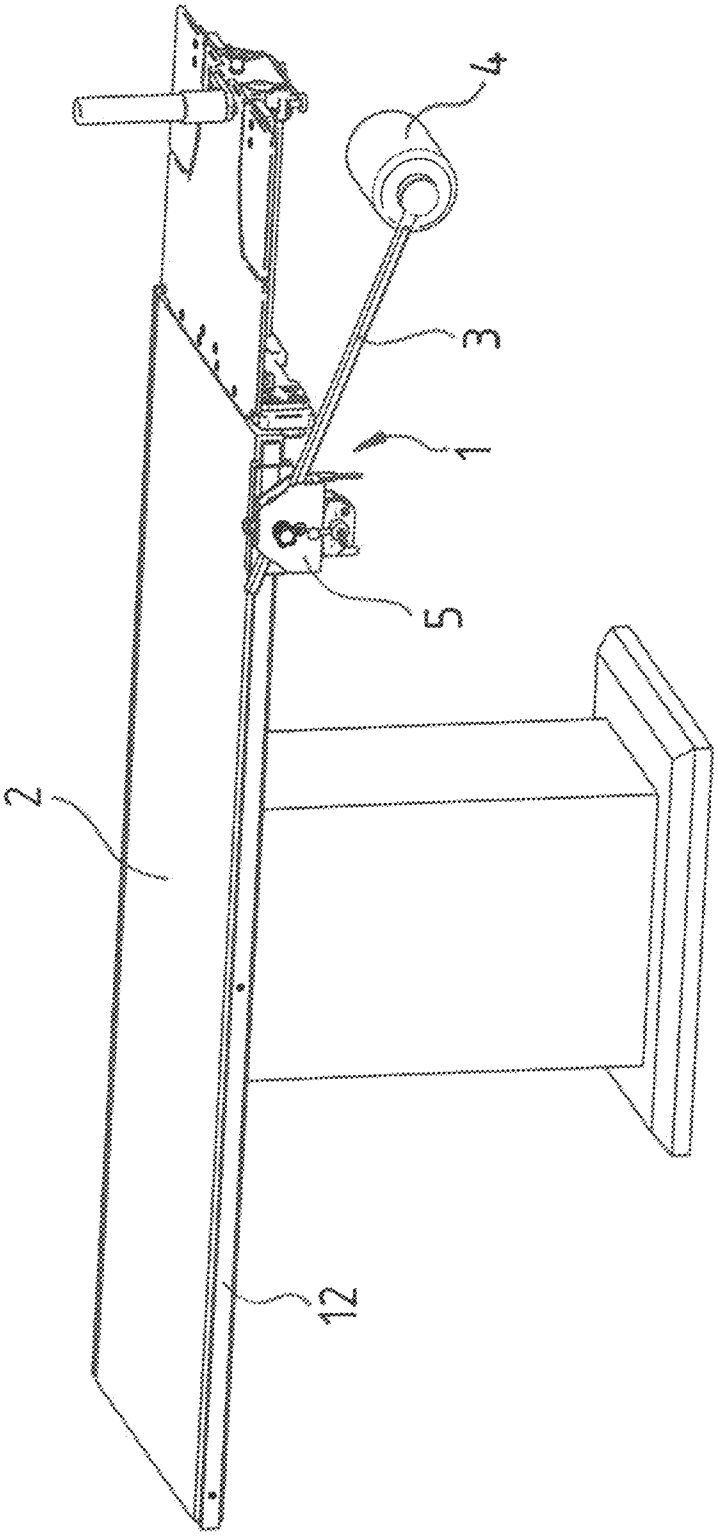
FIG. 1 is a diagrammatic, perspective view of an operating table with a hypomochlion disposed on the right.
Figure 2:
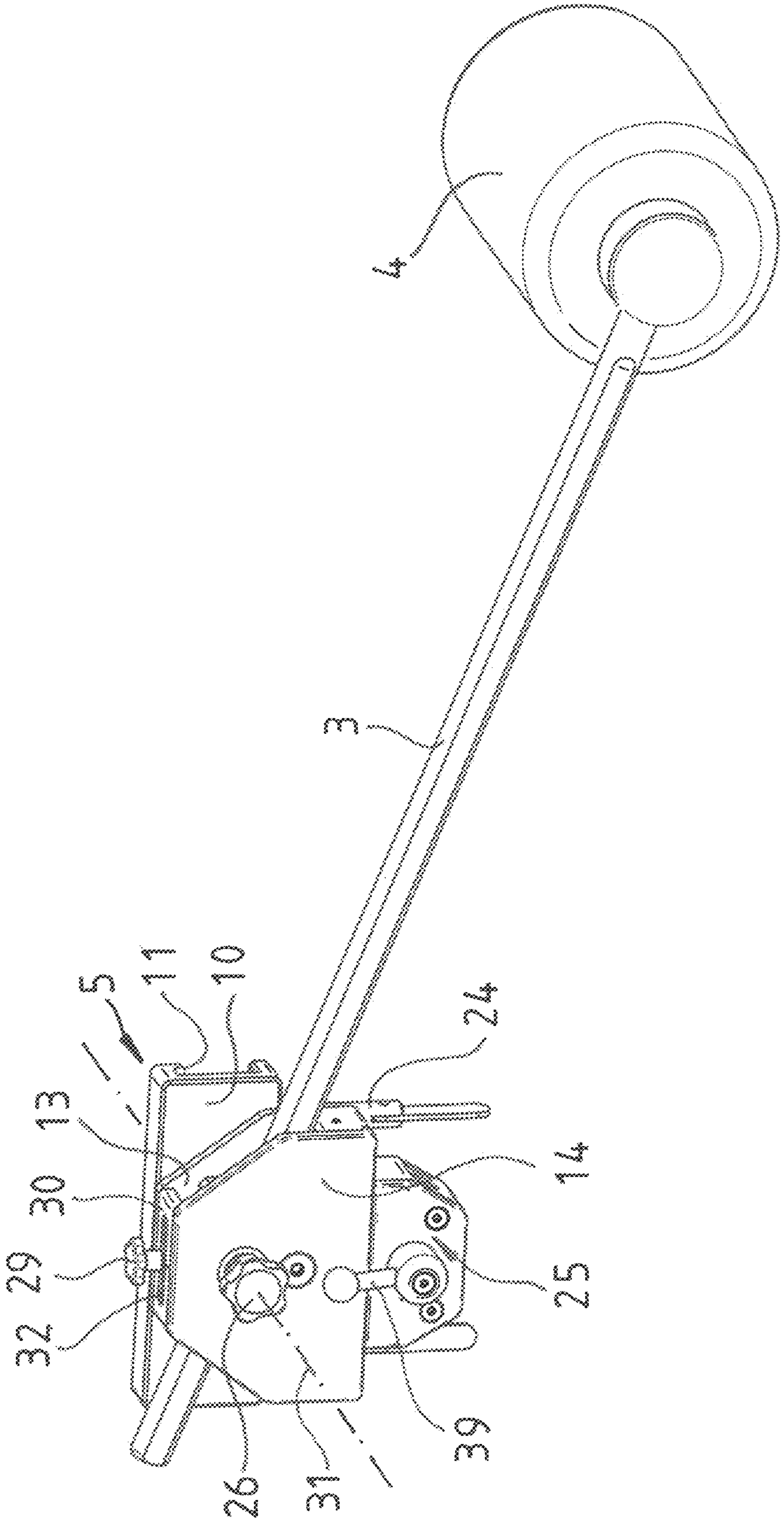
FIG. 2 is an enlarged perspective view of the hypomochlion.

Referring now to the figures of the drawings in detail, there is seen a hypomochlion 1 of an operating table 2, which is able to be disposed on both sides of the operating table, and is basically formed of a control device 5 for a support arm 3 which is mounted in the latter in a longitudinally adjustable manner in a transverse recess 27 of a control disk 6 pivotable through an angle and which is inserted there from the rear toward the front and, at its right-angled end, has a femoral support 4 which is configured in this case as a cushioned roll, as is also shown in FIGS. 1 and 2. Furthermore, for each side of the operating table, the hypomochlion 1 is formed of a reverse pivot device 7 which is releasable in a pivoting direction from the bottom upward and which is composed of a spring-loaded control wedge 8 which engages in a wedge gap between a functional surface 17 of the control device 5 and a convex front-side control surface 16 of the control disk 6, wherein the control device 5 is equipped with an adjusting device 25 common to both control wedges 8.

Figure 3:
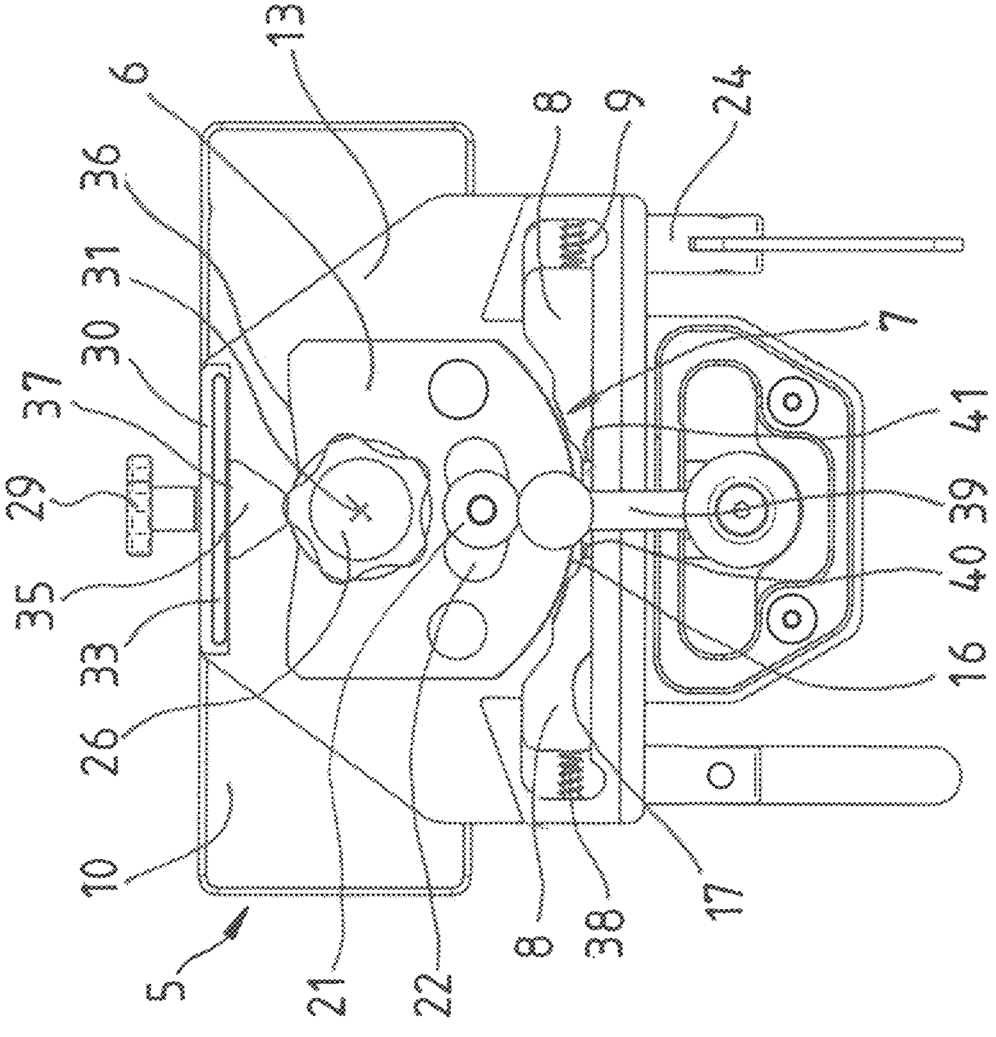
FIG. 3 is a further enlarged, front-elevational view of the control device of the hypomochlion.
Figure 4:
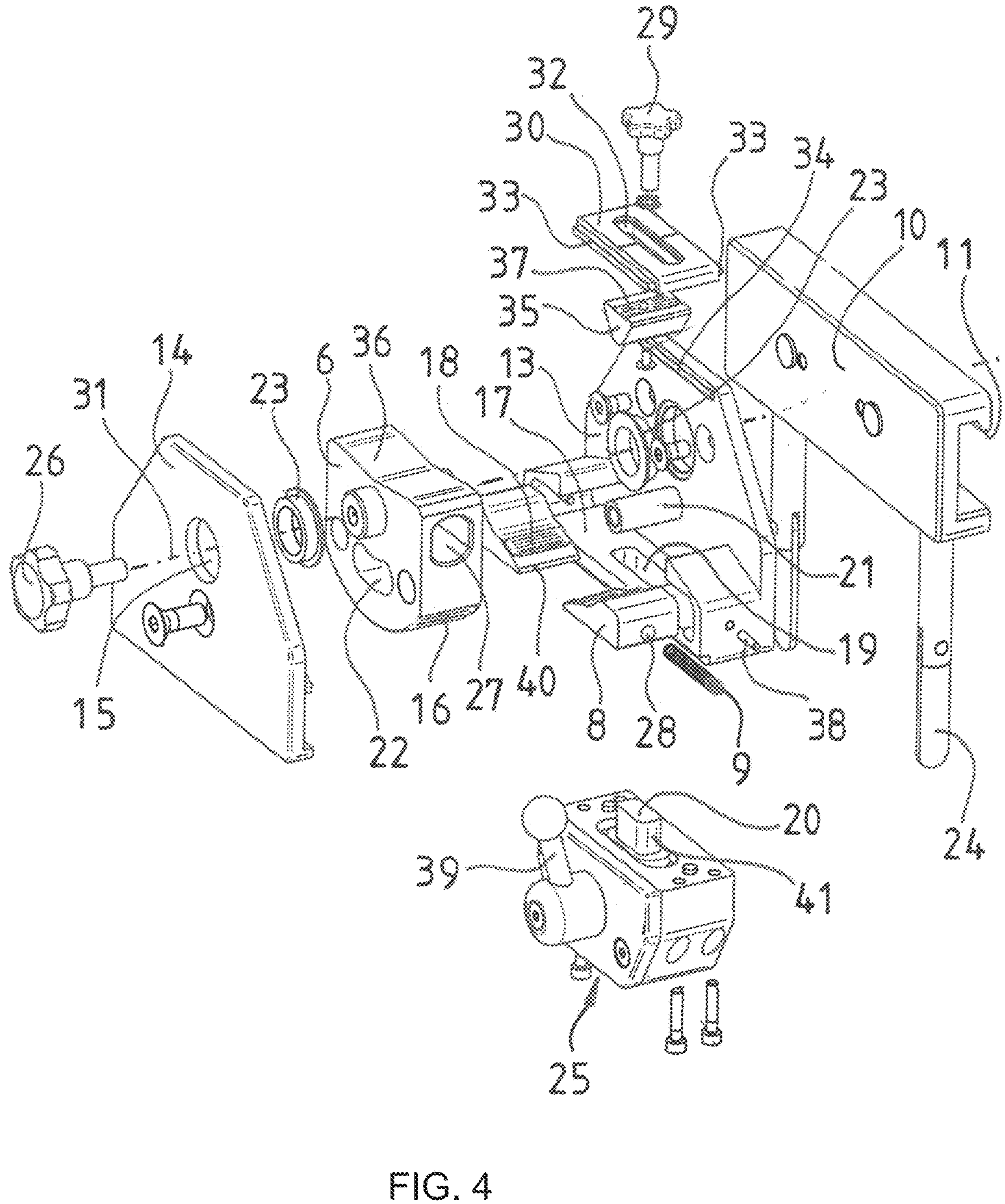
FIG. 4 is an exploded, perspective view of the control device.

This adjusting device 25 has a control slide 20 which extends from below in front of the narrow sides of the control wedges 8 formed as contact surfaces 40 and which has functional surfaces 41 which, with the contact surfaces 40, in a zero position simultaneously hold both control wedges 8 out of engagement with the control disk 6, as is shown in FIG. 3.

In an operating position, the control slide 20 is moved laterally in a direction to the front until a functional surface 41 and a contact surface 40 of the opposite side are not in contact with each other and the corresponding rear control wedge 8 is pressed with its wedge surface 18 into the wedge gap, as a result of which an angle adjustment of a support arm 3 of a hypomochlion 1 is permitted from the bottom upward but locked from the top downward. Thus, during an operation, the femoral support 4 of the hypomochlion 1 can be placed in a supporting manner under a patient's femur without being able to give way accidentally.

The control device 5 basically is formed of a vertical base plate 10 with a bracket 11 facing the operating table rail 12 and with the end-side clamping screws 24 for clamping on the operating table rail 12. On the side opposite the bracket 11, the base plate 10 carries the control chuck 13 of the control device 5 which, like the control cover 14 of the control device 5, also has bearing bushes 23 for the rotatable pivoting of the control disk 6 between the control chuck 13 and the cover 14. Furthermore, the control chuck 13 is provided with a stationary horizontal guide bolt 21, which extends through an arc-shaped recess 22 in the control disk 6, wherein the recess 22 has the radius about the pivot axis 31 and thus mechanically limits the maximum pivoting movement of the control disk 6.

In order to be able to be disposed on both sides of an operating table, the control device 5 is configured symmetrically, and the control disk 6 advantageously has a cylindrical-section-shaped control surface 16 of the control disk 6 common to both wedge surfaces 18 of the control wedges 8, as a result of which the production of the control disk 6 is hugely simplified compared to the control disk known from the prior art with two separate curve lines.

Moreover, the control chuck 13 has a plane functional surface 17 which is parallel to and spaced apart from the tangent to the control surface 16 and on which two control wedges 8 are disposed in opposite directions with their acute angles toward each other, which control wedges 8 each extend by elastic compression springs 9, formed as metallic spiral springs, inward from both sides into the clamping gap between the functional surface 17 and the control surface 16 of the control disk 6. The two control wedges 8 have a shallow wedge angle of between 2° and 8°; the effective wedge surface 18 and the control surface 16 of the control disk 6 have mutual latching devices, which mesh with each other in an operating position of the hypomochlion 1.

Furthermore, the control wedges 8 have at each end a recess 28 for cylinder pins 38 which are disposed in the control chuck 13 and which support the compression springs 9.

In order to be able to actuate the control wedges 8 from the outside, an adjusting device 25 is disposed under the control device 5, from which a control slide 20 extends upward through an oblong hole 19 of the control chuck 13 and on which, in a zero position, the points of the control wedges 8 bear with their functional surfaces 40 in such a way that the control wedges 8 are not in contact with the control surface 13 and the teeth of the control disk 6. In the adjusting device 25, the control slide 20 can be moved forward via an actuating lever 39 into an actuation position in the direction of the head part of an operating table 2, wherein the control wedge 8 disposed in this direction is moved further out of the wedge gap counter to the spring force of the compression spring 9, and the opposite control wedge 8 no longer abuts against the functional surface 41 of the control slide 20, but is instead pressed into the wedge gap by the compression spring 9. In the case of a support arm 3 of the hypomochlion 1 being introduced from the rear forward into the transverse recess 27 of the control disk 6, the femoral support 4 can now be moved from the bottom upward in a circular arc about the pivot axis 31, wherein the corresponding control wedge 8 can be moved slightly in the direction of the compression spring 9, skipping over the fine teeth, whereas a reverse pivot movement of the support arm 3 is prevented by the teeth of the control wedge 8, since the latter rests on the surface 17 of the control chuck 13 and is pressed further into the wedge gap by the teeth, as a result of which the locking itself is strengthened and a functionally reliable reset lock 7 is thus formed.

On its upper side opposite the lower toothed concave control surface 16, the control disk 6 is equipped with a stop surface 36, on which a height stop 35 of the control device 5 engages adjustably in a direction transverse to the pivot axis 31 of the control disk 6 and adjustably limits the angular deflection of the support arm 3.

The control chuck 13 and the control cover 14, between which the control disk 6 is disposed pivotably, have two upper horizontal receiving grooves 34 into which projections 33 of a guide plate 30 extend, which guide plate is disposed above the control disk 6 and held clamped between the control chuck 13 and the control cover 14 and has a horizontal oblong hole 32 through which a clamping screw 29 extends from the top downward into the height stop 35, wherein the oblong hole 32 is oriented transversely with respect to the pivot axis 31 of the control disk 6, in such a way that the height stop 35 can be positioned in a zero position centrally above the pivot axis 31 of the control disk 6 or is movable therefrom in the oblong hole 32 in the direction of the femoral support 4 and thus bears on the stop surface 36 of the control disk 6 and can thus adjustably limit the pivot angle thereof. The latching surface 37 of the height stop 35, facing toward the guide plate 30, and the underside of the guide plate 30 are equipped with reciprocal teeth so that, once adopted, an angular adjustment of the support arm 3 can be fixed in a force-locking and form-locking manner.

The following is a summary list of reference numerals and the corresponding structure used in the above description of the invention:

1 hypomochlion
2 operating table
3 support arm
4 femoral support
5 control device
6 control disk
7 reverse pivot lock
8 control wedge
9 compression spring
10 base plate
11 bracket
12 operating table rail
13 control chuck
14 control cover
15 recess
16 control surface
17 functional surface
18 wedge surface
19 oblong hole
20 control slide
21 guide bolt
22 arc-shaped recess
23 bearing bushing
24 clamping screw
25 adjusting device
26 star knob
27 transverse recess
28 recess
29 clamping screw
30 guide plate
31 pivot axis
32 oblong hole
33 projection
34 receiving groove
35 height stop
36 stop surface
37 latching surface
38 cylinder pin
39 actuating lever
40 contact surface
41 functional surface

The invention claimed is:

1. A hypomochlion of an operating table, the hypomochlion comprising:

a control device having a control disk pivotable through an angle, a functional surface, an end-side femoral support, and a reverse pivot lock releasable in a pivoting direction, said control disk having a convex front-side control surface;

a support arm to be controlled by said control device, said support arm being mounted in said control device in a longitudinally adjustable manner in a transverse recess of said control disk;

a spring-loaded control wedge engaging in a wedge gap between said functional surface of said control device and said convex front-side control surface of said control disk, said control wedge having a narrow side;

said control device including an adjusting device having a control slide extending in front of said narrow side of said control wedge; and said control wedge, in a zero position, being held out of engagement with said control surface and said control wedge, in an operating position, with said control slide moved out of contact, being in engagement with said control surface and permitting an angle adjustment of said support arm in a direction of rotation from a bottom upward and locking said support arm in an opposite direction of rotation from a top downward.

2. The hypomochlion according to claim 1, wherein said control wedge has a wedge surface and a shallow wedge angle of between 2° and 8°, and said wedge surface and said control surface of said control disk have reciprocal toothing.

3. The hypomochlion according to claim 1, wherein:

said convex front-side control surface of said control disk is toothed;

said control disk has a pivot axis and a side opposite said toothed concave control surface, said opposite side has an upper stop surface; and said control device has a height stop disposed on said upper stop surface, engaging adjustably in a direction transverse to said pivot axis of said control disk and adjustably limiting a possible angular deflection of said support arm counter to a direction of support.

4. The hypomochlion according to claim 3, which further comprises:

a control chuck and a control cover;

said control disk being disposed pivotably between said control chuck and said control cover;

a guide plate disposed above said height stop and clamped between said control chuck and said control cover above said stop surface of said control disk, said guide plate having an oblong hole oriented transversely relative to said pivot axis, and said guide plate having an underside with teeth;

a clamping screw extending through said oblong hole from above into said height stop disposed under said guide plate; and said height stop having a latching surface facing said guide plate, said latching surface having teeth and a lower surface of contact with said upper stop surface of said control disk.

5. The hypomochlion according to claim 4, wherein said control chuck has a protruding bolt below said pivot axis, said protruding bolt extending through an arc-shaped recess about said pivot axis in said control disk and limiting a maximum pivoting movement of said control disk.

6. The hypomochlion according to claim 3, which further comprises:

a star knob;

said control slide having functional surfaces;

said control wedge being one of two control wedges disposed in opposite directions and having pointed contact surfaces directed toward each other, said contact surfaces, in a zero position, bearing on said functional surfaces of said control slide;

said two control wedges permitting said control device to be disposed on both sides of the operating table; and said control disk being configured to pivot freely over said pivot axis of said control disk upon said star knob being released and said height stop being in a central position.

7. The hypomochlion according to claim 1, wherein said adjusting device has an actuating lever for said control slide, said actuating lever configured to be releasably lockable in a zero position and in at least one operating position.

* * * * *